US 7,488,935 B2

(12) United States Patent
Altmayer

(10) Patent No.: US 7,488,935 B2
(45) Date of Patent: Feb. 10, 2009

(54) APPARATUS AND METHOD FOR PROCESSING OF MASS SPECTROMETRY DATA

(75) Inventor: Lee H. Altmayer, Wilmington, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 194 days.

(21) Appl. No.: 11/165,871

(22) Filed: Jun. 24, 2005

(65) Prior Publication Data
US 2007/0023642 A1 Feb. 1, 2007

(51) Int. Cl.
*B01D 59/44* (2006.01)
(52) U.S. Cl. .......................... 250/281; 250/282
(58) Field of Classification Search ............... 250/288, 250/281–300
See application file for complete search history.

(56) References Cited

U.S. PATENT DOCUMENTS

| 4,641,324 | A | | 2/1987 | Karsh et al. |
| 5,453,613 | A | * | 9/1995 | Gray et al. ................. 250/281 |
| 5,592,402 | A | * | 1/1997 | Beebe et al. .................. 703/6 |
| 5,995,989 | A | * | 11/1999 | Gedcke et al. .............. 708/300 |
| 6,566,652 | B1 | * | 5/2003 | Kato .......................... 250/288 |
| 6,586,728 | B1 | | 7/2003 | Gavin et al. |
| 6,590,204 | B2 | | 7/2003 | Baranov |
| 6,765,199 | B2 | | 7/2004 | Youngquist et al. |
| 6,873,915 | B2 | * | 3/2005 | Hastings ...................... 702/22 |
| 2004/0035183 | A1 | | 2/2004 | O'Brien et al. |
| 2004/0142496 | A1 | | 7/2004 | Nicholson et al. |
| 2004/0267459 | A1 | | 12/2004 | van der Greef et al. |
| 2007/0278395 | A1 | * | 12/2007 | Gorenstein et al. .......... 250/282 |

OTHER PUBLICATIONS

Yasui et al., "An Automated Peak Identification/Calibration Procedure for High-Dimensional Protein Measures from Mass Spectrometers," Journal of Biomedicine and Biotechnology, 2003:4 (2003); 242-248.

* cited by examiner

*Primary Examiner*—Jack I Berman
*Assistant Examiner*—Andrew Smyth

(57) ABSTRACT

A mass spectrometry system is described. The mass spectrometry system includes an ion source to ionize a sample stream, a detector positioned downstream with respect to the ion source to acquire mass spectrometry data of the sample stream, and a data analyzer connected to the detector. The data analyzer includes a chromatogram generator to process the mass spectrometry data to derive a chromatogram, a data point selector to apply a selection criterion to the chromatogram to select data points from the chromatogram, and a peak discriminator to apply a discriminating criterion to the data points to detect a peak in the chromatogram, wherein the peak is indicative of a presence of an analyte in the sample stream. A computer-readable medium for a mass spectrometry system and a method of processing mass spectrometry data are also described.

19 Claims, 5 Drawing Sheets

APPARATUS AND METHOD FOR PROCESSING OF MASS SPECTROMETRY DATA

BACKGROUND

Various analytical instruments can be used for analyzing analytes, such as proteins and other biomolecules. Mass spectrometry systems have gained prominence because of their ability to handle a wide variety of analytes with high sensitivity and rapid throughput. For example, biomolecules can be identified via analysis of spectra acquired using a mass spectrometry system. In some instances, a mass spectrometry system may be coupled to a chromatography system to identify analytes present in a sample stream. Typically, the sample stream passes through a chromatography column, such as a High Performance Liquid Chromatography ("HPLC") column, which is packed with a stationary phase that has adsorbent characteristics. The analytes can exhibit different levels of adsorption onto the stationary phase, thus allowing the analytes to be separated as they exit the chromatography column. Successive eluting portions of the sample stream flow from the chromatography column into the mass spectrometry system, which repeatedly scans the sample stream to acquire spectra from the eluting portions. Typically, the spectra are then processed for presentation in a manner that facilitates identification of the analytes as chromatographic peaks. Such processing is sometimes referred to as "chromatogram reconstruction" and can be used to derive a variety of chromatograms, such as total ion chromatograms, base peak chromatograms, and mass chromatograms. Detection and characterization of a peak in a resulting chromatogram allow for identification of an analyte associated with the peak as well as determination of an amount of that analyte in the sample stream.

Certain conventional techniques for detection and characterization of peaks rely on taking first or second derivatives of a chromatogram to determine whether and where a peak is present. Such conventional techniques can perform in a satisfactory manner for processing smooth, Gaussian-like peaks in a relatively noise-free environment. However, certain types of mass spectrometry systems present challenges in terms of accuracy and efficiency at which resulting chromatograms can be processed. One particular type of mass spectrometry system that is often used is a tandem mass spectrometer, such as a tandem quadrupole mass spectrometer. A tandem quadrupole mass spectrometer is also sometimes referred to as a "triple quadrupole mass spectrometer." Chromatograms derived using a tandem quadrupole mass spectrometer can sometimes comprise jagged peaks and a relatively high level of noise, which can sometimes occur as spikes. Such characteristics of the chromatograms can cause conventional techniques to perform poorly. In particular, conventional techniques can erroneously characterize a single, jagged peak as multiple peaks and can erroneously detect spikes or other types of noise as peaks. In addition, conventional techniques can be prone to errors with respect to start and stop points when calculating an area of a peak.

These deficiencies of conventional techniques result from taking derivatives, since taking a derivative of a signal generally enhances a level of noise in that signal. Attempts have been made to address these deficiencies using adjustable parameters that control a degree of smoothing. However, such attempts can require supervision by an experienced user, who manually selects or tunes the adjustable parameters. As can be appreciated, manual selection of the adjustable parameters can be tedious and time-consuming. Moreover, the adjustable parameters may have to be repeatedly re-tuned over the course of different measurements, thus complicating a subsequent measurement workflow as well as subjecting the subsequent measurement workflow to bias, errors, or inconsistencies.

SUMMARY

The invention provides a mass spectrometry system. The mass spectrometry system comprises an ion source to ionize a sample stream, a detector positioned downstream with respect to the ion source to acquire mass spectrometry data of the sample stream, and a data analyzer connected to the detector. The data analyzer comprises a chromatogram generator to process the mass spectrometry data to derive a chromatogram, a data point selector to apply a selection criterion to the chromatogram to select data points from the chromatogram, and a peak discriminator to apply a discriminating criterion to the data points to detect a peak in the chromatogram, wherein the peak is indicative of a presence of an analyte in the sample stream.

Advantageously, embodiments of the invention allow for processing of mass spectrometry data, such that peaks can be detected and characterized with improved accuracy and efficiency. For some embodiments of the invention, such improved accuracy and efficiency can be achieved using a technique that can discriminate peaks from spikes and other types of noise. Desirably, this technique can operate without requiring taking derivatives and without requiring supervision by a user. Also, this technique can employ reliable statistics-based measures to optimize discrimination and characterization of peaks. Moreover, this technique can provide enhanced capabilities for signal-based diagnosis, which can be based on verifiable statistics-based measures.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
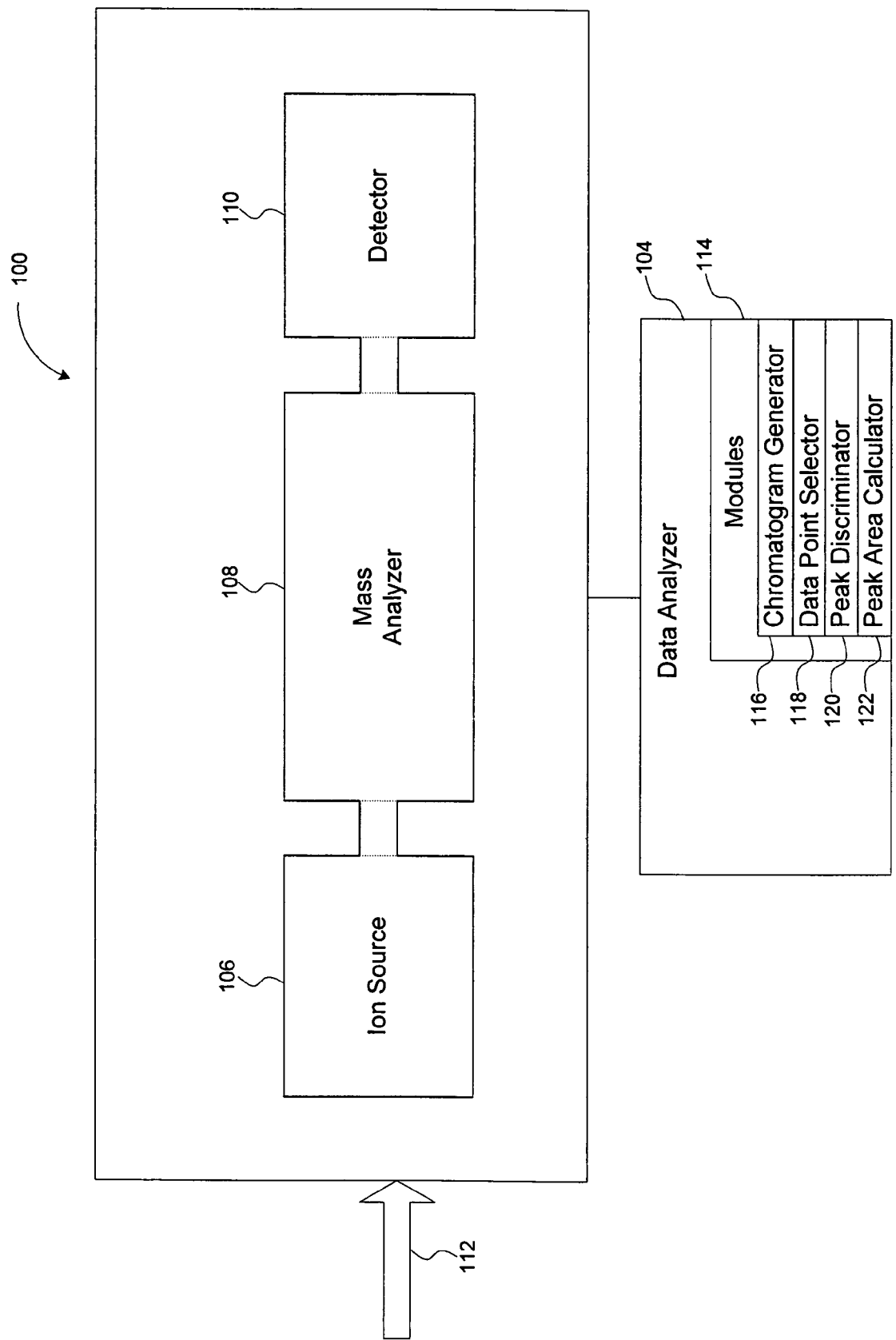
FIG. 1 illustrates a block diagram of a mass spectrometry system implemented in accordance with an embodiment of the invention.

The following definitions apply to some of the elements described with respect to some embodiments of the invention. These definitions may likewise be expanded upon herein.

As used herein, the singular terms "a," "an," and "the" comprise plural referents unless the context clearly dictates otherwise. Thus, for example, reference to a data analyzer can comprise multiple data analyzers unless the context clearly dictates otherwise.

As used herein, the term "set" refers to a collection of one or more elements. Thus, for example, a set of data points can comprise a single data point or multiple data points. Elements of a set can also be referred to as members of the set. Elements of a set can be the same or different. In some instances, elements of a set can share one or more common characteristics.

As used herein, the term "mass spectrometry data" refers to data obtained using a mass spectrometry system. Mass spectrometry data can comprise "raw" data acquired using a mass spectrometry system, data derived based on such "raw" data, or a combination thereof. Thus, for example, mass spectrometry data can comprise data in the form of a set of spectra that are acquired using a mass spectrometry system. As another example, mass spectrometry data can comprise data in the form of a set of chromatograms that are derived based on a set of spectra.

As used herein, the term "spectrum" refers to a representation of mass spectrometry data as a function of mass-to-charge ratio. In some instances, a spectrum can comprise a sequence of data points that are arranged based on mass-to-charge ratio. Examples of spectra comprise mass spectra and fragmentation spectra.

As used herein, the term "chromatogram" refers to a representation of mass spectrometry data as a function of scan number or time. In some instances, a chromatogram can comprise a sequence of data points that are arranged based on scan number or time. Examples of chromatograms comprise total ion chromatograms, base peak chromatograms, and mass chromatograms.

As used herein, the term "peak" refers to an interesting or relevant portion of mass spectrometry data. Typically, a peak is indicative of a presence of a particular analyte, an amount of that analyte, or both. In the case of a chromatogram, a peak present in the chromatogram can sometimes be referred to as a "chromatographic peak." In some instances, a peak can comprise a set of data points from a sequence of data points, such that the set of data points exhibit "positive" deviations relative to a baseline associated with the sequence of data points. The number of consecutive data points comprising a peak can sometimes be referred to as a "width" of the peak. Thus, for example, a peak can comprise multiple, consecutive data points that exhibit "positive" deviations with respect to a baseline and, thus, can comprise a width that is at least 2 data points and is typically greater than 2 data points. The extent of a region defined by an envelope of a peak and a baseline can sometimes be referred to as an "area" of the peak.

As used herein, the term "noise" refers to an uninteresting or irrelevant portion of mass spectrometry data. Noise can result from a wide variety of sources, such as data processing artifacts, chemical impurities, fluctuations in ambient conditions, fluctuations in operating conditions, a solvent or solvent system present in a sample stream, and operation of a detector or other components of a mass spectrometry system. Examples of noise comprise background noise, drift, and spikes.

As used herein, the term "spike" refers to a type of noise that can be present in mass spectrometry data. In some instances, a spike can comprise a set of data points from a sequence of data points, such that the set of data points exhibit "positive" deviations relative to a baseline associated with the sequence of data points. The number of consecutive data points comprising a spike can sometimes be referred to as a "width" of the spike. Spikes can differ from peaks in terms of their widths. In particular, a width of a spike is typically smaller than a width of a peak. Thus, for example, a spike can comprise a single, isolated data point that exhibits a "positive" deviation with respect to a baseline and, thus, can comprise a width that is 1 data point.

As used herein, the term "matched filter" refers to a type of filter that is defined based on a set of known or expected characteristics of a signal to be processed. For example, a matched filter may comprise a set of non-zero filter coefficients to provide a weighted sum of a number of data points to either side of a center data point. Thus, for example, a matched filter can be defined to fully weight a number of data points to either side of a zero weighted center data point. The number of fully weighted data points plus one can sometimes be referred to as a "width" of a matched filter, and the width of the matched filter can be defined based on a known or expected width of a peak to be detected.

Attention first turns to FIG. 1, which illustrates a mass spectrometry system 100 implemented in accordance with an embodiment of the invention. In the illustrated embodiment, the mass spectrometry system 100 is implemented as a tandem quadrupole mass spectrometer to provide multiple stages of mass analysis. However, it is contemplated that the mass spectrometry system 100 can be implemented in a variety of other ways to provide multiple stages of mass analysis. It is also contemplated that the mass spectrometry system 100 can be implemented to provide a single stage of mass analysis.

As illustrated in FIG. 1, the mass spectrometry system 100 comprises an ion source 106, which operates to produce ions. In the illustrated embodiment, the ion source 106 is implemented to produce ions using Electrospray Ionization ("ESI"). One benefit of ESI is that it can be readily used in conjunction with a variety of separation procedures, such as HPLC. However, it is also contemplated that the ion source 106 can be implemented to produce ions using another type of ionization process, such as Matrix Assisted Laser Desorption Ionization ("MALDI"), Atmospheric Pressure-Matrix Assisted Laser Desorption Ionization ("AP-MALDI"), or the like.

As illustrated in FIG. 1, the ion source 106 ionizes analytes present in a sample stream 112. For example, the sample stream 112 can comprise biomolecules that are dispersed in a suitable solvent or solvent system. In the illustrated embodiment, the sample stream 112 is introduced into the ion source 106 in a continuous or flowing fashion from a chromatography column (not illustrated in FIG. 1), such as a HPLC column, and successive eluting portions of the sample stream 112 can be analyzed by the mass spectrometry system 100 as further described below.

Referring to FIG. 1, the mass spectrometry system 100 also comprises a mass analyzer 108, which is positioned downstream with respect to the ion source 106 to receive ions. The mass analyzer 108 operates to separate or select ions by mass-to-charge ratio. Depending on a particular operation mode of the mass spectrometry system 100, the mass analyzer 108 can also operate to induce fragmentation of ions to produce product ions. In the illustrated embodiment, the mass analyzer 108 is implemented using a pair of quadrupole mass filters (not illustrated in FIG. 1) and a collision cell (not illustrated in FIG. 1) that can be positioned between the pair of quadrupole mass filters. However, it is contemplated that the mass analyzer 108 can be implemented in a variety of other ways, such as using a pair of ion trap devices, a pair of magnetic sector spectrometers, a pair of time-of-flight devices, or a combination of different ones of an ion trap device, a magnetic sector spectrometer, a quadrupole mass filter, and a time-of-flight device.

As illustrated in FIG. 1, the mass spectrometry system 100 also comprises a detector 110, which is positioned downstream with respect to the mass analyzer 108 to receive ions. The detector 110 operates to detect the abundance of ions to acquire a set of spectra of the sample stream 112. The detector 110 can be implemented in a variety of ways, such as using an electron multiplier, a scintillation counter, or the like.

Referring to FIG. 1, the mass spectrometry system 100 also comprises a data analyzer 104, which is connected to the ion source 106, the mass analyzer 108, and the detector 110, using any wired or wireless transmission channel. The data analyzer 104 operates to process mass spectrometry data acquired using the mass spectrometry system 100. Advantageously, the data analyzer 104 allows for processing of mass spectrometry data, such that peaks can be detected and characterized with improved accuracy and efficiency. In turn, such improved accuracy and efficiency facilitate identification of analytes present in the sample stream 112 as well as determination of amounts of ions that are produced from the analytes. In the illustrated embodiment, the data analyzer 104 can provide such improved accuracy and efficiency by operating based on a technique that can discriminate peaks from spikes and other types of noise. Advantageously, this technique can operate without requiring taking derivatives, thus providing enhanced immunity to noise relative to certain conventional techniques. Also, this technique can be automated and, thus, can operate without requiring supervision by a user and without requiring manual selection of adjustable parameters. Moreover, this technique can provide enhanced capabilities for signal-based diagnosis.

As illustrated in FIG. 1, the data analyzer 104 comprises a set of modules 114 that perform the operations described herein. The set of modules 114 can be implemented in a variety of ways, such as using computer code, hardwired circuitry, or a combination of computer code and hardwired circuitry. It is contemplated that the data analyzer 104 can comprise or can operate in conjunction with a computing device, such as a personal computer, a server computer, a web appliance, a personal digital assistant product, or the like. In some instances, the data analyzer 104 can provide a user interface to allow a user to specify a variety of processing options.

Referring to FIG. 1, the set of modules 114 comprise a chromatogram generator 116, which processes mass spectrometry data acquired using the mass spectrometry system 100 to derive a chromatogram. The set of modules 114 also comprise a data point selector 118, which applies a selection criterion to the chromatogram to select data points from the chromatogram. The set of modules 114 also comprise a peak discriminator 120, which applies a discriminating criterion to the data points that are selected to detect a peak in the chromatogram. The peak can be indicative of a presence of an analyte in the sample stream 112. As illustrated in FIG. 1, the set of modules 114 further comprise a peak area calculator 122, which calculates an area of the peak. The area of the peak can be indicative of an amount of ions that are produced from the analyte, which, in turn, can be indicative of an amount of the analyte in the sample stream 112.

The foregoing provides a general overview of an embodiment of the invention. Attention next turns to FIG. 2, which illustrates operations that can be performed in accordance with a method of an embodiment of the invention. In particular, FIG. 2 illustrates operations that can be performed to detect and to characterize peaks in mass spectrometry data.

Figure 2:
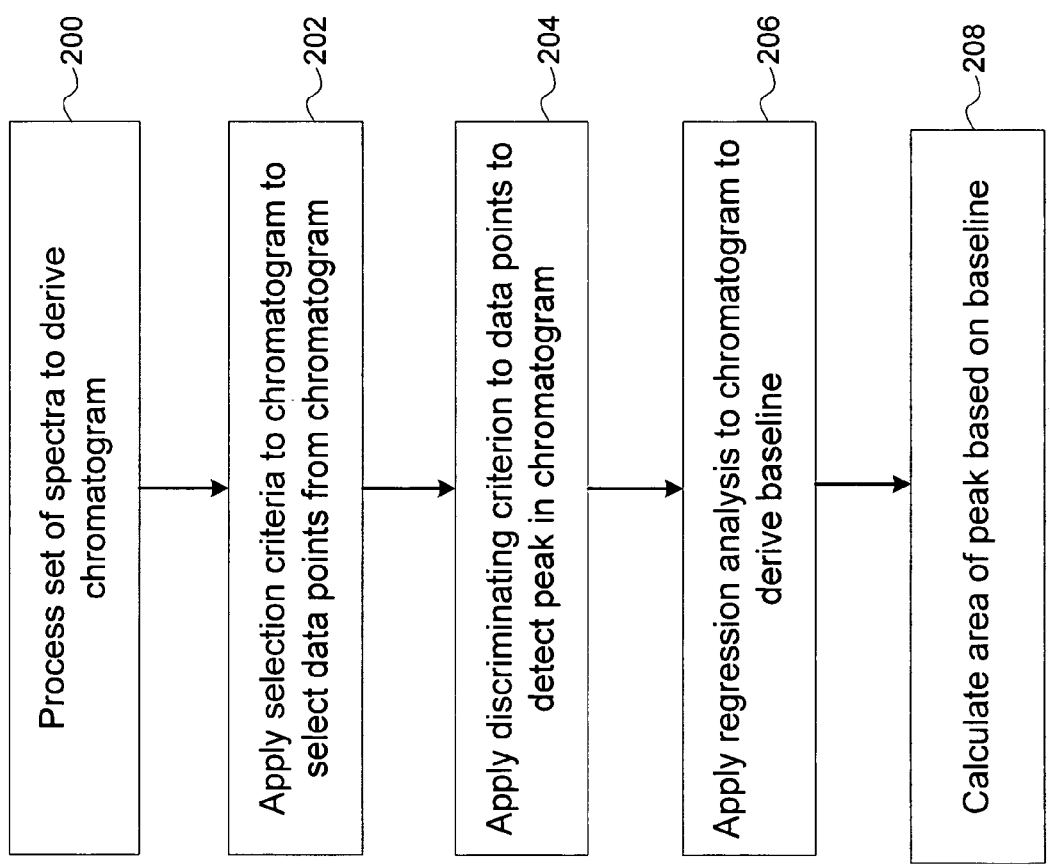
FIG. 2 illustrates operations performed in accordance with a method of an embodiment of the invention.

With reference to FIG. 2, a set of spectra are initially processed to derive a chromatogram (block 200). In particular, successive eluting portions of a sample stream are scanned to acquire the set of spectra from the eluting portions. The set of spectra are recorded and processed to derive the chromatogram, which can be a total ion chromatogram, a base peak chromatogram, or a mass chromatogram. In the illustrated embodiment, the chromatogram comprises a sequence of data points that are arranged by scan number or time.

Figure 3:
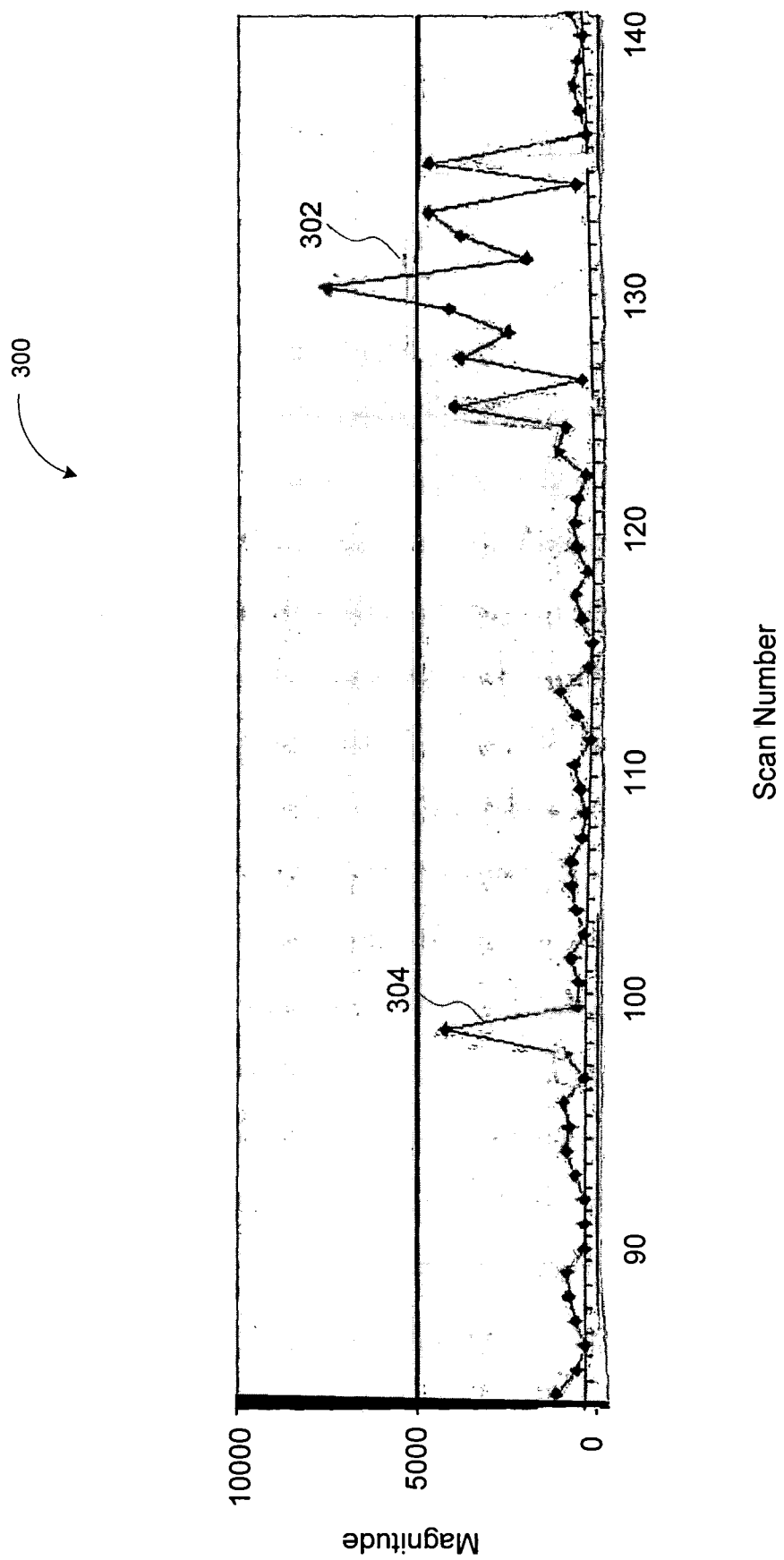
FIG. 3 illustrates an example of a chromatogram that can be processed in accordance with an embodiment of the invention.

FIG. 3 illustrates an example of a chromatogram 300 that can be processed in accordance with an embodiment of the invention. As illustrated in FIG. 3, the chromatogram 300 comprises a sequence of data points that are arranged by scan number. Here, each data point of the sequence of data points comprises a magnitude that represents an abundance or intensity value for a particular scan number. The chromatogram 300 comprises a jagged peak 302, which is centered at scan number 130 and is indicative of a particular analyte of interest. The jagged peak 302 is preceded and followed by a number of data points that correspond to noise, which comprises a spike 304 that is centered at scan number 99. In the illustrated example, the jagged peak 302 comprises multiple, consecutive data points that exhibit "positive" deviations with respect to a typical range of variation associated with the sequence of data points, while the spike 304 comprises a single, isolated data point that exhibits a "positive" deviation with respect to this typical range of variation.

Referring back to FIG. 2, a selection criterion is next applied to the chromatogram to select data points from the chromatogram (block 202). In particular, the selection criterion is applied to select the data points that may be of interest, namely those data points that may correspond to peaks, spikes, or both. In the illustrated embodiment, the selection criterion is used to select the data points based on magnitudes of the data points. Advantageously, a reordered sequence of data points is derived to facilitate selection of the data points. The reordered sequence of data points provides additional benefits as further described below.

Figure 4:
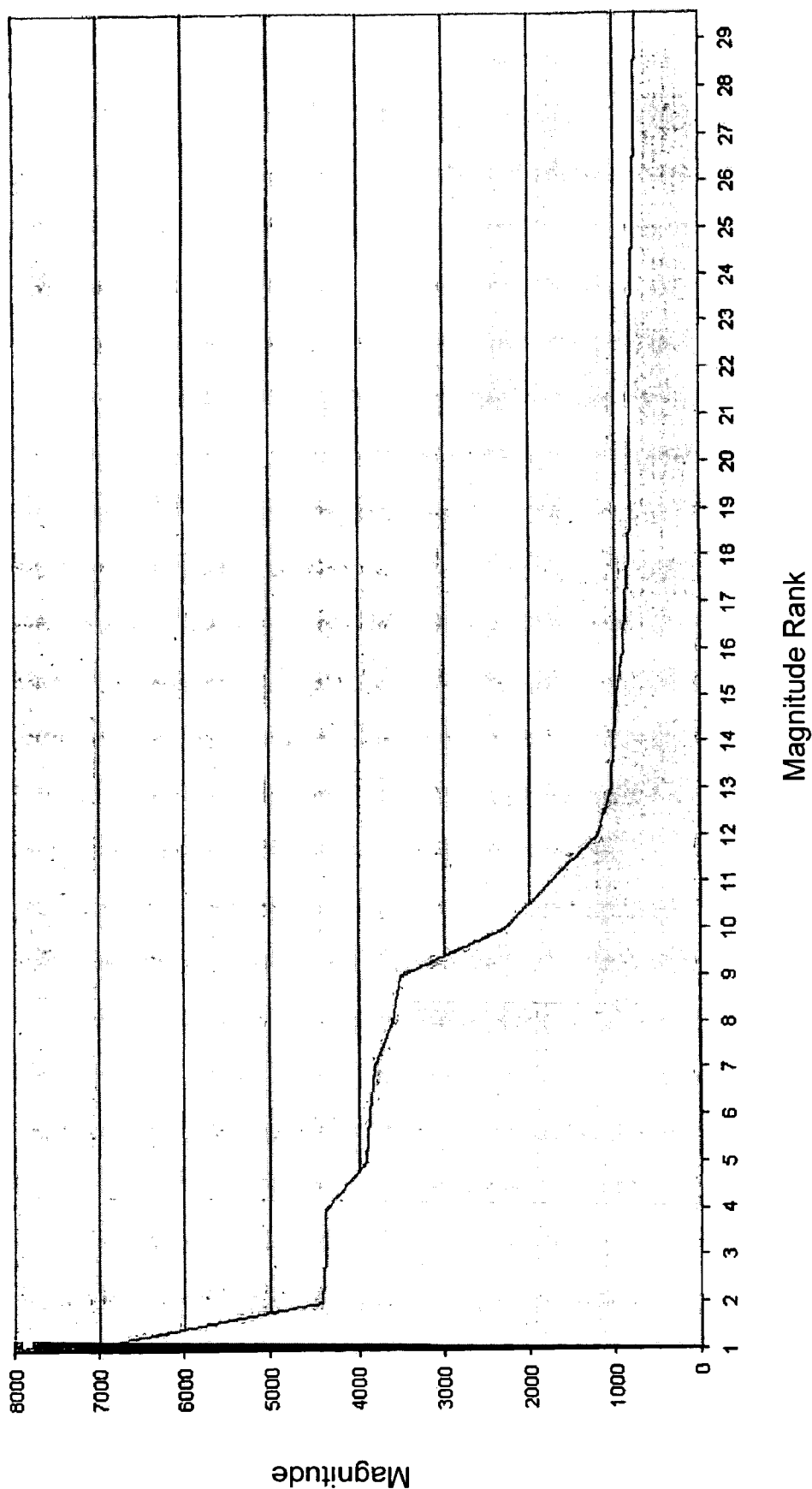
FIG. 4 illustrates a reordered sequence of data points derived from the chromatogram of FIG. 3, according to an embodiment of the invention.

FIG. 4 illustrates a reordered sequence of data points derived from the chromatogram 300 of FIG. 3, according to an embodiment of the invention. As illustrated in FIG. 4, the reordered sequence of data points is derived by arranging or sorting data points from the chromatogram 300 by magnitude, from greatest to lowest. Here, each data point of the chromatogram 300 is assigned a magnitude rank, such that a data point comprising the greatest magnitude is assigned a magnitude rank of 1, a data point comprising the second greatest magnitude is assigned a magnitude rank of 2, and so forth. As illustrated in FIG. 4, the reordered sequence of data points facilitates identification of those data points that may be of interest, namely those data points that comprise the greatest magnitudes. In the illustrated example, the top dozen data points in terms of magnitude comprise data points that may correspond to peaks, spikes, or both.

Referring back to FIG. 2, once the reordered sequence of data points is derived, the data points are selected from the reordered sequence of data points. In particular, the data points are selected based on the magnitudes of the data points with respect to a lower threshold value. In such manner, those data points that comprise the greatest magnitudes can be identified. In general, the lower threshold value can be defined in a variety of ways, such as in absolute terms, in relative terms, or both. Thus, for example, the lower threshold value can be defined in absolute terms, such as based on a particular limiting value, thus allowing identification of those data points comprising magnitudes greater than or equal to the lower threshold value. As another example, the lower threshold value can be defined in relative terms, such as based on the top n data points in terms of magnitude, thus allowing identification of those data points comprising magnitudes greater than magnitudes of remaining data points from the chromatogram.

Advantageously, the lower threshold value can be defined based on statistics of the reordered sequence of data points, thus providing enhanced capabilities for signal-based diagnosis. In particular, the lower threshold value can represent a typical range of variation associated with the chromatogram and can be defined based on an estimated baseline value plus an estimated noise amplitude value. The estimated baseline value and the estimated noise amplitude value can be derived in a variety of ways. For example, a linear regression analysis can be performed on a region comprising a median of the reordered sequence of data points to derive a regression line. Statistical analyses can be performed to verify suitability of the region or to select a different region for deriving the regression line. A particular amplitude along the regression line can represent the estimated baseline value, and a slope of the regression line can represent the estimated noise amplitude value. Deviations above the regression line can correspond to peaks or spikes, while deviations below the regression line, if any, can correspond to negative disturbances or missing data. If desired, the estimated noise amplitude value can be refined by measuring standard deviations, higher order moments, and extrema from a set of non-adjacent regions of the sequence of data points comprising the chromatogram. In some instances, the refined noise amplitude value can comprise an average of standard deviations of likely baseline regions, namely those with little or no drift and without data points that may correspond to peaks or spikes.

As illustrated in FIG. 2, a discriminating criterion is next applied to the data points to detect a set of peaks in the chromatogram (block 204). In particular, the discriminating criterion is applied to the data points that are selected using the selection criterion. In the illustrated embodiment, the discriminating criterion is used to discriminate those data points that correspond to peaks from those data points that correspond to spikes or other types of noise. Advantageously, the discriminating criterion can be used to discriminate peaks from spikes without requiring taking derivatives, thus providing enhanced immunity to noise. Also, as further described below, the discriminating criterion can be defined based on statistics of the reordered sequence of data points, thus providing enhanced capabilities for signal-based diagnosis.

In the illustrated embodiment, a matched filter is defined to allow detection of peaks in the chromatogram. In general, the matched filter can be defined in a variety of ways. For example, the matched filter can comprise a set of non-zero filter coefficients to provide a weighted sum of a number of data points to either side of a center data point in the chromatogram. In particular, the matched filter can be symmetrical to fully weight a number of data points to either side of a zero weighted center data point, such as using filters coefficients with values [1, 0, 1], [1, 1, 0, 1, 1], or [1, 1, 1, 0, 1, 1, 1]. The number of fully weighted data points plus one can sometimes be referred to as a "width" of the matched filter, and the width of the matched filter can be defined to correspond to or to be matched with an expected width of a peak. An output of the matched filter is then derived by subtracting an offset value from the weighted sum of data points. The offset value can be derived based on the estimated baseline value multiplied by the number of fully weighted data points and a number slightly greater than unity. Thus, for example, an output of the matched filter with a width of five can be derived as follows:

$$\text{Output} = DP_{t-2} + DP_{t-1} + DP_t + DP_{t+1} + DP_{t+2} - (4 * \text{estimated baseline value} * m), \quad (1)$$

where $DP_{t-2}$ refers to a data point at scan number or time $t-2$, $DP_{t-1}$ refers to a data point at scan number or time $t-1$, $DP_t$ refers to a center data point at scan number or time $t$, $DP_{t+1}$ refers to a data point at scan number or time $t+1$, $DP_{t+2}$ refers to a data point at scan number or time $t+2$, and $m$ is any number greater than unity, such as 1.1 or 1.2. When applied to a baseline region, an output of the matched filter is negative. When a spike is present as the center data point, an output of the matched filter is also negative. However, when an apex of a peak is present as the center data point, an output of the matched filter is positive. Typically, an output of the matched filter is also positive when another data point comprising the peak is present as the center data point.

Once derived, the matched filter is applied with respect to the reordered sequence of data points, starting from a data point comprising the greatest magnitude as the center data point of the matched filter. If the data point is determined to correspond to a spike, then this data point is removed from additional consideration, and a next data point in the reordered sequence of data points is evaluated. On the other hand, if the data point is determined to correspond to an apex of a peak, then data points to either side of the data point in the chromatogram are evaluated using the matched filter. In such manner, boundaries of the peak as well as a width of the peak can be determined. Next, data points corresponding to the peak are removed from additional consideration, and a next data point in the reordered sequence of data points is evaluated as described above. Evaluation continues until remaining data points in the reordered sequence of data points comprise magnitudes that fall below the lower threshold value. If there is a mismatch between the width of the matched filter and a width of a peak (or should no peak be detected), the width of the matched filter can be adjusted accordingly, and the operations described above can be repeated. It is also contemplated that an asymmetry or the offset value of the matched filter can be adjusted based on characteristics of a peak (or should no peak be detected), and the operations described above can be repeated.

As illustrated in FIG. 2, a regression analysis is next applied to the chromatogram to derive a baseline (block 206). In particular, after a search for peaks is concluded and at least one peak is detected, likely baseline regions, namely those with little or no drift and without data points that may correspond to peaks or spikes, are identified. In particular, these likely baseline regions can comprise data points in the reordered sequence of data points that comprise magnitudes below the lower threshold value. It is also contemplated that these likely baseline regions can be identified based on evaluating outputs of the matched filter for these likely baseline regions. Regression analyses and other types of statistical analyses can be performed on these likely baseline regions as a whole, thus providing a global evaluation of their flatness and suitability for use as a baseline. Next, these likely baseline regions can be subdivided into regions that are adjacent to each detected peak. Regression analyses and other types of statistical analyses can be performed on these adjacent regions to rank their flatness and suitability for use as a baseline. In such manner, adjacent regions to either side of a peak can be selected, and a resulting regression line can serve as a baseline for that peak.

Figure 5:
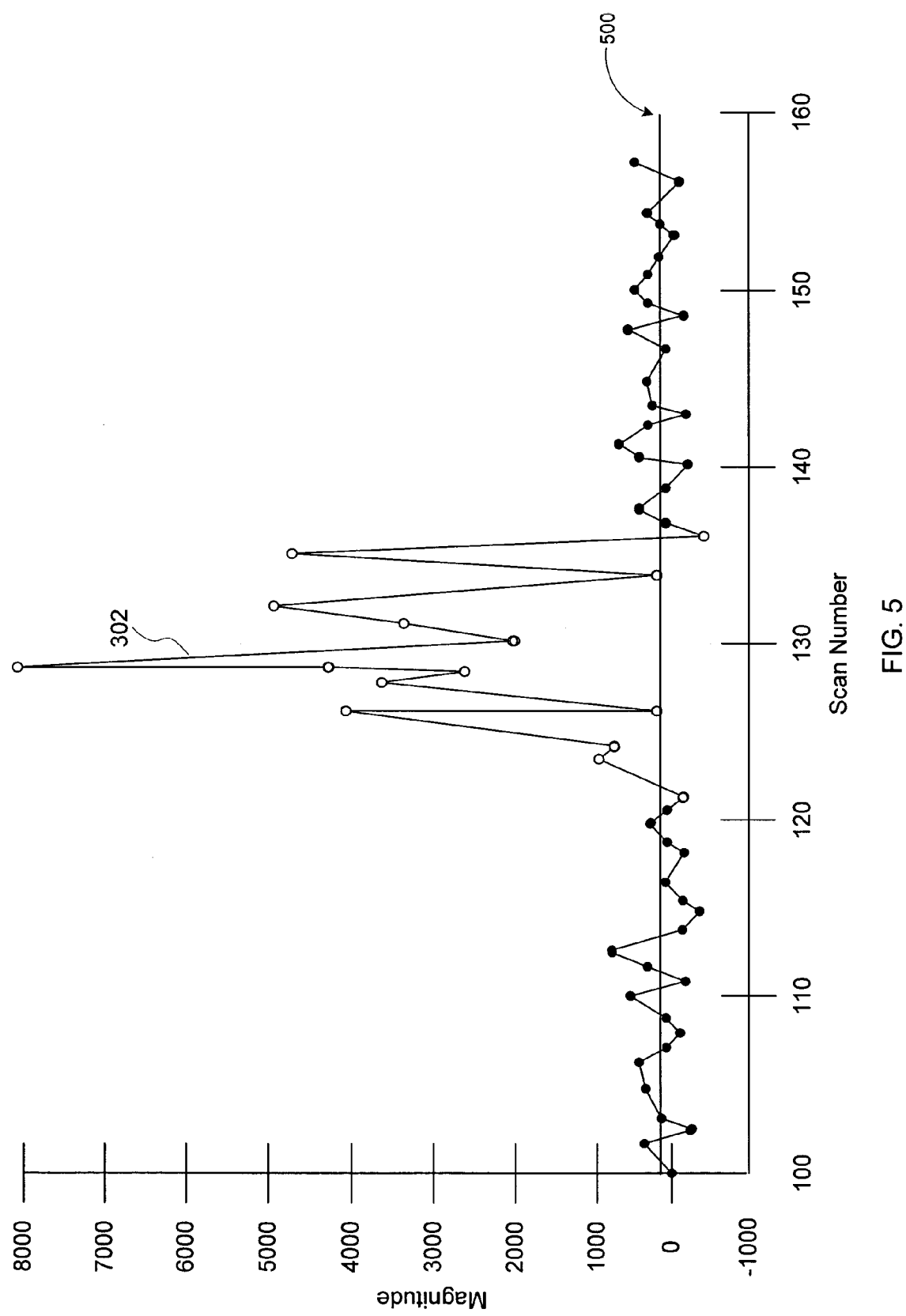
FIG. 5 illustrates the chromatogram of FIG. 3 with a baseline superimposed thereon, according to an embodiment of the invention.

FIG. 5 illustrates the chromatogram 300 of FIG. 3 with a baseline 500 superimposed thereon, according to an embodiment of the invention. In particular, FIG. 5 illustrates a portion of the chromatogram 300 that comprises the jagged peak 302 along with the baseline 500 that is derived for the jagged peak 302. In the illustrated example, a number of data points preceding and following the jagged peak 302 are selected based on their flatness and suitability for deriving the baseline 500.

Turning back to FIG. 2, an area of each detected peak is calculated based on a baseline derived for that peak (block 208). Calculation of areas can be performed in a variety of ways, such as using any of a variety of numerical integration procedures. Referring to FIG. 5, for example, an area of the jagged peak 302 is defined by an envelope of the jagged peak 302 and the baseline 500 and can be calculated using numerical integration.

It should be recognized that the embodiments of the invention described above are provided by way of example, and various other embodiments are encompassed by the invention. For example, while certain operations have been described as being performed with respect to a chromatogram, it is contemplated that these operations can be performed with respect to other types of mass spectrometry data. It is also contemplated that these operations can be advantageously used to detect and to characterize peaks in a variety of other types of signals.

An embodiment of the invention relates to a computer storage product with a computer-readable medium comprising computer code or executable instructions thereon for performing a set of computer-implemented operations. The medium and computer code can be those specially designed and constructed for the purposes of the invention, or they can be of the kind well known and available to those having ordinary skill in the computer software arts. Examples of computer-readable media comprise: magnetic media such as hard disks, floppy disks, and magnetic tape; optical media such as Compact Disc- Read Only Memories ("CD-ROMs") and holographic devices; magneto-optical media such as floptical disks; and hardware devices that are specially configured to store and execute computer code, such as Application-Specific Integrated Circuits ("ASICs"), Programmable Logic Devices ("PLDs"), Read Only Memory ("ROM") devices, and Random Access Memory ("RAM") devices. Examples of computer code comprise machine code, such as produced by a compiler, and files comprising higher-level code that are executed by a computer using an interpreter. For example, an embodiment of the invention can be implemented using Java, C++, or other object-oriented programming language and development tools. Additional examples of computer code comprise encrypted code and compressed code. Moreover, an embodiment of the invention can be downloaded as a computer program product, which can be transferred from a remote computer to a requesting computer by way of data signals embodied in a carrier wave or other propagation medium via a transmission channel. Accordingly, as used herein, a carrier wave can be regarded as a computer-readable medium. Another embodiment of the invention can be implemented in hardwired circuitry in place of, or in combination with, computer code.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

I claim:

1. A mass spectrometry system, comprising:
   (a) an ion source to ionize a sample stream;
   (b) a detector positioned downstream with respect to the ion source to acquire mass spectrometry data of the sample stream; and
   (c) a data analyzer connected to the detector and comprising:
      (i) a chromatogram generator to process the mass spectrometry data to derive a chromatogram that includes a sequence of data points arranged based on scan number;
      (ii) a data point selector to reorder the sequence of data points according to magnitudes of the sequence of data points to thereby generate a reordered sequence of data points and to apply a selection criterion to the reordered sequence of data points to select data points from the chromatogram; and
      (iii) a peak discriminator to apply a matched filter to the data points to detect a peak in the chromatogram, wherein a width of the matched filter is defined based on an expected width of the peak, and the peak is indicative of a presence of an analyte in the sample stream.

2. The mass spectrometry system of claim 1, wherein the chromatogram corresponds to one of a total ion chromatogram, a base peak chromatogram, and a mass chromatogram.

3. The mass spectrometry system of claim 1, wherein the data point selector is configured to apply the selection criterion to select the data points based on magnitudes of the data points.

4. The mass spectrometry system of claim 1, wherein the peak discriminator is configured to apply the matched filter to identify a first set of data points from the data points as corresponding to the peak.

5. The mass spectrometry system of claim 4, wherein the peak discriminator is configured to apply the matched filter to identify a second set of data points from the data points as corresponding to a spike.

6. The mass spectrometry system of claim 1, wherein the data analyzer further comprises a peak area calculator to calculate an area of the peak, wherein the area of the peak is indicative of an amount of ions produced from the analyte.

7. The mass spectrometry system of claim 6, wherein the data points correspond to first data points from the chromatogram, and the peak area calculator is configured to apply an analysis to second data points from the chromatogram to derive a baseline.

8. A computer-readable storage medium for a mass spectrometry system, comprising:
   (a) code to select data points from a chromatogram based on magnitudes of the data points, wherein the chromatogram comprises a sequence of data points arranged based on scan number, each data point of the sequence of data points has a magnitude that is indicative of abundance for a particular scan number, and the code in (a) comprises:

(i) code to arrange the sequence of data points based on magnitude to derive a reordered sequence; and (ii) code to select the data points from the reordered sequence of data points; and (b) code to apply a discriminating criterion to the data points to detect a peak in the chromatogram, wherein the peak is indicative of a presence of an analyte.

9. The computer-readable storage medium of claim 8, wherein the code in (a) comprises code to select the data points from the reordered sequence of data points based on the magnitudes of the data points with respect to a lower threshold value.

10. The computer-readable storage medium of claim 8, wherein the code in (a) comprises code to select the data points from the reordered sequence of data points based on the magnitudes of the data points with respect to magnitudes of remaining data points from the reordered sequence of data points.

11. The computer-readable storage medium of claim 8, wherein the code in (b) comprises code to apply a matched filter to the data points.

12. The computer-readable storage medium of claim 8, wherein the code in (b) comprises code to identify a first set of data points from the data points as corresponding to the peak.

13. The computer-readable storage medium of claim 12, wherein the code in (b) further comprises code to identify a second set of data points from the data points as corresponding to a spike.

14. The computer-readable storage medium of claim 8, wherein the data points correspond to first data points from the chromatogram, and the computer-readable medium further comprises: code to apply a regression analysis to second data points from the chromatogram to derive a baseline; and code to calculate an area of the peak based on the baseline, wherein the area of the peak is indicative of an amount of the analyte.

15. A method of processing mass spectrometry data, comprising:

(a) defining a matched filter based on a sequence of data points; and (b) applying the matched filter to the sequence of data points to identify a first set of data points from the sequence of data points as corresponding to a peak and to identify a second set of data points from the seciuence of data points as corresponding to a spike, wherein a width of the matched filter corresponds to an expected width of the peak, and the peak is indicative of a presence of an analyte.

16. A method of processing mass spectrometry data, comprising:

(a) defining a matched filter based on a sequence of data points; and (b) applying the matched filter to the sequence of data points to identify a first set of data points from the seciuence of data points as corresponding to a peak, wherein a width of the matched filter corresponds to an expected width of the peak, and the peak is indicative of a presence of an analyte, wherein the defining the matched filter in (a) comprises deriving an offset value of the matched filter based on the sequence of data points.

17. The method of claim 16, wherein the offset value comprises an estimated baseline value associated with the sequence of data points.

18. The method of claim 15, further comprising selecting data points from the sequence of data points based on magnitudes of the data points, and wherein the applying the matched filter in (b) comprises applying the matched filter to the data points to identify the first set of data points from the data points as corresponding to the peak.

19. A method of processing mass spectrometry data, comprising:

(a) defining a matched filter based on a sequence of data points;

(b) applying the matched filter to the seciuence of data points to identify a first set of data points from the sequence of data points as corresponding to a peak, wherein a width of the matched filter corresponds to an expected width of the peak, and the neak is indicative of a presence of an analyte;

(c) selecting data points from the sequence of data points based on magnitudes of the data points, wherein the applyina the matched filter in (b) comprises applyina the matched filter to the data points to identify the first set of data points from the data points as corresponding to the peak; and (d) reordering the sequence of data points, prior to said selecting data points, wherein the sequence of data points is reordered based on magnitudes of the data points.

* * * * *

UNITED STATES PATENT AND TRADEMARK OFFICE
CERTIFICATE OF CORRECTION

| | | |
|---|---|---|
| PATENT NO. | : 7,488,935 B2 | Page 1 of 1 |
| APPLICATION NO. | : 11/165871 | |
| DATED | : February 10, 2009 | |
| INVENTOR(S) | : Lee H. Altmayer | |

It is certified that error appears in the above-identified patent and that said Letters Patent is hereby corrected as shown below:

In column 11, line 2, in Claim 8, delete "sequence;" and insert -- sequence of data points; --, therefor.

In column 11, line 46, in Claim 15, delete "seciuence" and insert -- sequence --, therefor.

In column 12, line 10, in Claim 16, delete "seciuence" and insert -- sequence --, therefor.

In column 12, line 30, in Claim 19, delete "seciuence" and insert -- sequence --, therefor.

In column 12, line 34, in Claim 19, delete "neak" and insert -- peak --, therefor.

In column 12, line 38, in Claim 19, delete "applyina" and insert -- applying --, therefor.

In column 12, line 38, in Claim 19, delete "applyina" and insert -- applying --, therefor.

Signed and Sealed this
Twentieth Day of March, 2012

David J. Kappos
*Director of the United States Patent and Trademark Office*